United States Patent
Cagle

(10) Patent No.: US 7,129,003 B2
(45) Date of Patent: Oct. 31, 2006

(54) FULLERENE-BASED SECONDARY CELL ELECTRODES

(75) Inventor: Dawson W. Cagle, Arlington, VA (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 0 days.

(21) Appl. No.: 10/703,527

(22) Filed: Nov. 10, 2003

(65) Prior Publication Data

US 2004/0091783 A1    May 13, 2004

Related U.S. Application Data

(63) Continuation of application No. 09/866,492, filed on May 29, 2001, now abandoned.

(51) Int. Cl.
*H01M 4/58* (2006.01)
*C01B 31/02* (2006.01)

(52) U.S. Cl. ............... 429/231.8; 429/231.4; 423/445 B

(58) Field of Classification Search ........... 429/231.8, 429/231.4; 423/445 B
See application file for complete search history.

(56) References Cited

U.S. PATENT DOCUMENTS

| | | | |
|---|---|---|---|
| 5,269,953 A | 12/1993 | Whewell | |
| 5,302,474 A | 4/1994 | Shackle | |
| 5,380,703 A | 1/1995 | Kao et al. | |
| 5,395,496 A | 3/1995 | Tsantrizos et al. | |
| 5,447,796 A * | 9/1995 | Tsukamoto et al. | 428/408 |
| 5,470,680 A * | 11/1995 | Loutfy et al. | 429/218.2 |
| H1545 H | 6/1996 | Plichta et al. | |
| 5,538,814 A | 7/1996 | Kamauchi et al. | |
| 5,665,490 A | 9/1997 | Takeuchi et al. | |
| 5,705,296 A | 1/1998 | Kamauchi et al. | |
| 5,952,125 A | 9/1999 | Bi et al. | |
| 6,025,462 A | 2/2000 | Wang et al. | |
| 6,136,287 A | 10/2000 | Horne et al. | |
| 6,146,791 A * | 11/2000 | Loutfy et al. | 429/231.8 |
| 6,280,697 B1 * | 8/2001 | Zhou et al. | 423/414 |
| 6,613,198 B1 * | 9/2003 | Garvey et al. | 204/173 |
| 6,709,471 B1 * | 3/2004 | Miyamoto | 29/623.1 |
| 2004/0130693 A1 * | 7/2004 | Kurt | 355/67 |

FOREIGN PATENT DOCUMENTS

| | | |
|---|---|---|
| JP | 1191000283832 | 4/1993 |
| JP | 1992000116928 | 11/1993 |
| JP | 1992000117226 | 11/1993 |

(Continued)

OTHER PUBLICATIONS

Diener et al., "Isolation and properties of small-bandgap fullerenes", NATURE, vol. 393, Jun. 13, 1998, p. 668.*

(Continued)

*Primary Examiner*—Dah-Wei Yuan
(74) *Attorney, Agent, or Firm*—Edell, Shapiro, & Finnan, LLC

(57) ABSTRACT

This invention provides methods and materials for the manufacture of lithium ion rechargeable battery electrodes comprising fullerene compounds which have not been exposed to oxygen. Fullerene compounds are intercalated into carbonaceous materials to form electrodes having superior intercalation/deintercalation properties. Fullerene monomers, such as $C_{60}$, $C_{70}$, $C_{74}$, $C_{76}$, $C_{78}$, $C_{80}$, $C_{84}$ and $C_{80-100}$ and fluorinated derivatives thereof, are useful in the methods and materials of this invention. Materials incorporating $C_{74}$ are particularly preferred. The invention also provides fullerene polymer materials useful for lithium ion electrodes with greatly improved electrochemical properties.

7 Claims, 4 Drawing Sheets

FOREIGN PATENT DOCUMENTS

| | | | | |
|---|---|---|---|---|
| JP | 07006764 | A | * | 1/1995 |
| JP | 07014573 | A | * | 1/1995 |
| JP | 07296799 | A | * | 11/1995 |
| JP | 1994000107921 | | | 11/1995 |
| RU | 2183190 | C2 | | 3/2002 |

OTHER PUBLICATIONS

Zhang et al., "The effect of different kinds of inert gases and their pressures on the preparation of carbon nanotubes by carbon arc method", Materials Chemistry and Physics, vol. 58, Issue 1, Feb. 25, 1999, pp. 1-5. (Abstract only).*

Nalimova et al., "Lithium interaction with carbon nanotubes", Synthetic Metals 88 (1997) 89-93.*

Diener and Alford, "Isolation and Properties of Small-Bandgap Fullerenes," Nature 393:668-671, 1998.

Konarev and Lyubovskaya, "Donor—Acceptor Complex and Radical Ionic Salts on Fullerenes," Russ. Chem. Rev. 68(1):19-38, 1999.

Segar et al., "Prospects for Using $C_{60}$ and $C_{70}$ in Lithium Batteries", J. Electrochem. Soc. 138(12):, Dec. 1991, pp. L81-L82.

Chabre et al., "Electrochemical Intercalation of Lithium into Solid $C_{60}$", J. Am. Chem. Soc. 114:764-766, 1992.

Andreoni, et al., "Anomalous Electronic Behaviour of Na Superfullerides: Theory and Experiment," Europhys. Lett. 34(9):699-704, 1996.

Xie et al., "Electrochemical Detection of $C_{60}^{6-}$ and $C_{70}^{6-}$: Enhanced Stability of Fullerides in Solution," J. Am. Chem. Soc. 114:3978-3980, 1992.

Akimoto et al., Photoluminescence from Fluorinated Fullerene $C_{60}F_x(\chi<48)$ thin films, J. Luminescence 72-74:503-504, 1997.

Okino et al., Fluorination of Fullerene $C_{60}$ and Electrochemical Properties of $C_{60}F_x$, Synth. Metals 70:1447-1448, 1995.

Ohsawa and Saji, "Electrochemical Detection of $C_{60}^{6-}$ at Low Temperature," J. Chem. Soc., Chem. Commun., pp. 781-782, 1992.

Xie et al., Electrochemically-Reversible, Single-Electron Oxidation of $C_{60}$ and $C_{70}$, J. Am. Chem. Soc. 115:9818-9819, 1993.

Chlistunoff et al., Electrochemistry of Fullerene Films, Thin Solid Films 257:166-184, 1995.

Yang et al., "Reversible Fullerene Electrochemistry: Correlation with the HOMO-LUMO Energy Difference for $C_{60}$, $C_{70}$, $C_{76}$, $C_{78}$, and $C_{84}$," J. Am. Chem. Soc. 117:7801-7804, 1995.

Fujitsuka et al., Laser Flash Photolysis Study on Photophysical and Photochemical Properties of $C_{82}$, J. Phys. Chem. B 103:9519-9523, 1999.

Okino et al., Solid State Lithium Cells Based on Fluorinated Fullerene Cathodes, In. Proc. Symp. Rec. Adv. Chem. Phys. Fullerenes Rel. Mater., vol. 3, Kadish and Ruoff, Eds., pp. 191-198, May 1996.

Haddon et al., "Conducting Films of $C_{60}$ and $C_{70}$ by Alkali-Metal Doping," Nature 350:320-322, 1991.

Strasser and Ata, Electrochemical Synthesis of Polymerized $LiC_{60}$ Films, J. Phys. Chem. B 102:4131-4134, 1998.

Jiang and Koel, "Superfulleride Formation and Electronic Properties of $C_{60}$ K/Rh (111) Surfaces," Chem. Phys Lett. 223:69-75, 1994.

Allen et al., Molecular Structure of the Fulleride Anions in Superconducting $K_3$, $C_{60}$ and Insulating $K_6C_{60}$ Determined by Powder Neutron Diffraction, Chem. Mater. 7:764-770, 1995.

Tanigaki et al., Alkali Effects on the Electronic States of $K_3$, $C_{60}$ and $Rb_3C_{60}$, Chem. Phys. Lett. 240:627-632, 1995.

Dahn et al., "Carbons and Graphites as Substitutes for the Lithium Anode," bln Industrial Chemistry Library, vol. 5. Lithium Batteries: new materials, developments and perspectives, Pistoia, Ed., 1994 Elsevier, New York, pp. 1-47.

Reed and Bolska, Discrete Fulleride Anions and Fullerenium Cations, Chem. Rev. 100:1075-1120, 2000.

Tanigaki and Prassides, "Conducting and Superconducting Properties of Alkali-Metal $C_{60}$ Fullerides," J. Mater. Chem 5(10):1515-1527, 1995.

* cited by examiner

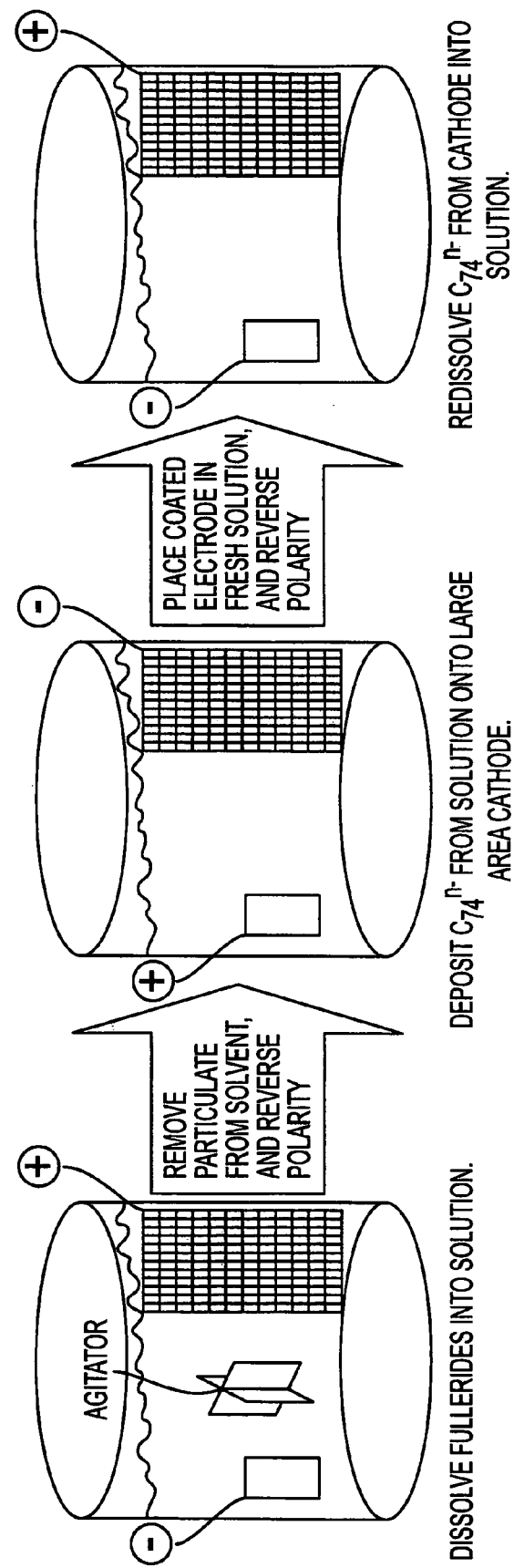

FULLERENE-BASED SECONDARY CELL ELECTRODES

CROSS REFERENCE TO RELATED APPLICATIONS

This application is a continuation of U.S. patent application Ser. No. 09/866,492, entitled "Fullerene Based Secondary Cell Electrodes", and filed May 29, 2001 now abandoned. The disclosure of this provisional patent application is incorporated herein by reference in its entirety.

BACKGROUND OF THE INVENTION

1. Technical Field

This invention relates to methods and compositions for the construction of anodes, cathodes and batteries of the lithium ion secondary (rechargeable) type. In particular, the invention relates to fullerene-based secondary cell components and methods and compositions for their construction.

2. Description of the Background Art

Lithium ion secondary (rechargeable) cells are commonly used as power sources in portable electronic devices. Such rechargeable cells generally use a lithium transition metal oxide (very often $Li_2CoO_2$ (lithium colbaltate)) cathode and an anode composed of a highly porous carbonaceous material, usually graphite or a pyrolyzed organic material. A lithium ion-soluble electrolyte is placed between the two electrodes, and the cell is charged. During the electrochemical process of charging, some of the lithium ions in the cathode material migrate from the cathode to the carbonaceous anode layer and completely intercalate into it. During discharge, the negative charge held by the anode is conducted out of the battery through its negative terminal, and the $Li^+$ ions migrate through the electrolyte to their original location in the cathode. When this migration is complete, the cell has been completely discharged, and the lithium ions in the battery are at an electronic "ground state."

The porous carbonaceous anode material can reversibly incorporate ions within its crystal lattice with only small structural changes. Structurally, graphite is a planar sheet of carbon atoms arranged in a honeycomb. The carbon layers are stacked to form what is commonly known as hexagonal (2H) or rhombohedral (3R) graphite. A certain amount of random stacking or disorder in the structure is common in graphite and in other carbon forms such as cokes, petroleum cokes, synthetic graphites, carbon blacks and the like.

Lithium ion batteries possess four main advantages over other rechargeable cells such as nickel metal hydride, nickel-cadmium, and lead-acid cells. First of all, lithium ions, due to their small size, can intercalate between carbon layers more easily and completely than larger battery ions such as nickel and lead. Because of this property, lithium ion cells do not form battery "memory" ion channels. Secondly, the electrical potential of lithium ions is the most similar to graphite (carbon) of any metal ion. This allows the easiest possible charge transfer between carbon battery anodes and migrating lithium ions. Better charge transfer gives these cells more efficient, complete, and long-lasting discharge rates. Thirdly, lithium cells are much less toxic than comparable secondary cells which use lead, cadmium or nickel metal ions. Fourthly, lithium, the lightest metal, has a high charge-to-mass ratio and thus produces a battery of lighter weight.

Although current lithium battery technology constitutes an enormous advance over that of previous commercial secondary cells, there are a number of shortcomings involving the current materials used as battery electrodes. Commercial lithium secondary cell cathodes are composed of lithium salts, such as lithium colbaltate, which allow less than 50% lithium ion migration to the anode. Largely due to the presence of two distinct ionization energies in the active cathode material (i.e., $[Li_2CoO_4] \leftrightarrows [Li^+][LiCoO_4] \leftrightarrows [2Li^+][CoO_4^{2-}]$) the battery never achieves its full theoretical charge potential. To overcome the activation energy barrier for lithium ion formation in the cathode, more energy must be put into the battery during charging than is returned during discharge. Some of the energy used to overcome this barrier is regained when the original compound is reformed, but some is lost as heat. Cathodes which do not have this high energy barrier would require less energy to charge and would achieve a more complete charge. Therefore, materials with more efficient charge transfer chemistries would be highly desirable.

The anodes used in lithium ion batteries also have certain characteristics which prevent optimal performance. Due to the nature of graphitic and pyrolyzed carbon anode materials, electrodes made from them are inevitably irregularly sized, non-directionally specific, and possess non-predictable "pockets" of charging where lithium ions can intercalate into the anode. The extended structure of the carbon compound chosen for the anode therefore influences both the total amount of lithium which can be intercalated within it and at what voltage. The electrical charge stored in the anode must be able to freely migrate between all points of the anode and the negative cell terminal for optimal performance. Poor orientational control increases resistance in the anode and reduces cell charge transfer efficiency as well. The carbon electrodes currently in use commercially employ various forms of amorphous or graphene layered carbon. By their very nature, the structure of these materials cannot be controlled at a molecular level to maximize their affinity for lithium ions.

Heat-treating these prior art carbonaceous materials increases their crystallinity and affects both their structure and their ability to intercalate lithium. Current methods of hydraulic compression and heat treatment significantly help this problem by creating a more regular structure, but the problem cannot be completely solved until the anode is manufactured in a manner such that the order and porosity is more controlled. Therefore, new carbon materials which can be manufactured with more controlled structure would be highly desirable and produce more efficient batteries.

Fullerenes are spherical or partially spherical aromatic compounds composed solely of triconjugate ($Sp^2$-hybridized) carbon atoms. As such, they resemble an ideal graphite sheet, but for the strain which their spherical shape imposes on the normally planar aromatic structure. This strain causes fullerenes to be more reactive than a continuous aromatic sheet. Fullerene molecules are highly electronegative as well, and possess unusual magnetic and electrical properties.

Improvements in the art of lithium ion batteries and battery electrodes therefore would be highly desirable. Such electrodes would enable the manufacture of smaller, lighter rechargeable batteries with longer life and more efficient charging for use in portable electronic devices such as telephones, CD players, hearing aids, computers, and the like, or any device where a high efficiency light weight rechargeable battery is desirable.

SUMMARY OF THE INVENTION

Accordingly, this invention provides a composition comprising a carbonaceous material such as graphite, pitch, coal pitch, coke, synthetic graphite, carbon black, lamellar graphite, carbon-arc generated soot or mixtures thereof, intercalated with $C_{74}$ which has not been exposed to oxygen. The compositions may also include additional fullerene compounds which have not been exposed to oxygen, such as $C_{60}$, $C_{70}$, $C_{76}$, $C_{78}$, $C_{84}$ or mixtures thereof. Preferred compositions comprise about 1% to about 25% fullerene by weight and about 75% to about 99% graphite by weight. Compositions also may further include one or more polymeric binder, such as polyvinylidene fluoride, polyethylene oxide, polyethylene, polypropylene, polytetrafluorethylene, polyacrylates, substituted derivatives thereof, copolymers thereof and mixtures thereof. Further embodiments of the invention include anodes for lithium ion secondary batteries comprising the compositions described above, and lithium ion secondary batteries comprising such anodes.

The invention further provides a method of making a carbonaceous anode comprising (a) providing a carbonaceous material such as graphite, pitch, coal pitch, coke, synthetic graphite, carbon black, lamellar graphite, carbon-arc generated soot and mixtures thereof; (b) providing at least one fullerene such as $C_{60}$, $C_{70}$, $C_{76}$, $C_{78}$, $C_{84}$ or mixtures thereof wherein the fullerenes have not been exposed to oxygen; (c) mixing the carbonaceous material and the fullerene(s) to form a mixture which contains about 1% to about 25% fullerene; (d) heating the mixture to a temperature of about 400° C. to about 900° C. and holding the mixture at a temperature of about 400° C. to about 900° C. for about 1 hour to about 8 hours to form a carbonaceous fullerene intercalate composition; (e) annealing the composition at a rate of about 1° C./min to about 10° C./min until the composition reaches room temperature; (f) mixing with the composition a polymeric binding material to form a fullerene intercalate-polymeric binder mixture which is about 3% to about 15% polymeric binder; and (g) pressing the fullerene intercalate-polymeric binder mixture at a pressure of about 2 atm to about 100 atm for about 1 hour to about 8 hours to form a carbonaceous anode, wherein all of the steps (a)–(g) are conducted in an atmosphere lacking oxygen. Preferred methods involve graphite and $C_{74}$. The invention also provides anodes made by the method described above.

In yet a further embodiment, the invention provides a lithium ion secondary battery carbonaceous anode comprising a $C_{74}$ star polymer wherein the $C_{74}$ star polymer has been synthesized from $C_{74}$ which has not been exposed to oxygen prior to polymer formation. Anodes also may include a polymeric binder such as polyvinylidene fluoride, polyethylene oxide, polyethylene, polypropylene, polytetrafluorethylene, polyacrylates, substituted derivatives thereof, copolymers thereof or mixtures thereof. The invention also provides lithium ion secondary batteries comprising such anodes.

In yet a further embodiment, the invention provides a composition comprising fluorinated graphite intercalated with fluorinated $C_{74}$ has not been exposed to oxygen prior to fluorination. Compositions also may include a polymeric binder such as polyvinylidene fluoride, polyethylene oxide, polyethylene, polypropylene, polytetrafluorethylene, polyacrylates, substituted derivatives thereof, copolymers thereof or mixtures thereof. The invention also provides cathodes comprising the above compositions and batteries comprising such cathodes.

In yet a further embodiment, the invention provides a method of making a carbonaceous cathode comprising (a) providing fluorinated graphite; (b) providing fluorinated $C_{74}$; (c) mixing the fluorinated graphite and fluorinated $C_{74}$ to form a mixture which contains about 1% to about 25% fullerene; (d) heating the mixture to a temperature of about 100° C. to about 900° C. and holding the mixture at a temperature of about 100° C. to about 900° C. for about 1 hour to about 8 hours to form a fluorinated fullerene intercalate composition; (e) annealing the composition at a rate of about 1° C./min to about 10° C./min until the composition reaches room temperature; (f) mixing with the composition a polymeric binder to form a fluorinated fullerene intercalate-polymeric binder mixture which is about 3% to about 15% polymeric binder; and (g) pressing the fluorinated fullerene intercalate-polymeric binder mixture at a pressure of about 2 atm to about 100 atm for about 1 hour to about 8 hours to form a carbonaceous cathode, wherein the fluorinated $C_{74}$ has not been exposed to oxygen prior to fluorination. The invention also provides cathodes made according to the above method.

BRIEF DESCRIPTION OF THE DRAWINGS

FIG. 4 is a diagram outlining steps for electrochemical purification of oxygen-sensitive $C_{74}$.

DETAILED DESCRIPTION OF THE PREFERRED EMBODIMENTS

Figure 1:
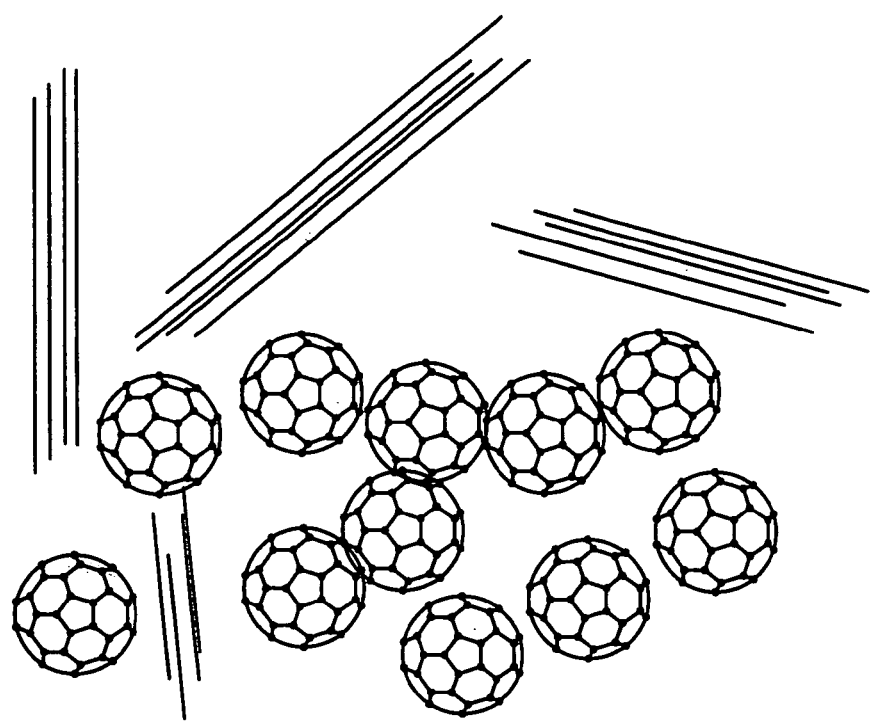
FIG. 1 is a conceptual illustration of individual fullerene molecules and graphite structures before and after heating at 800–900° C. under an argon atmosphere.
Figure 1:
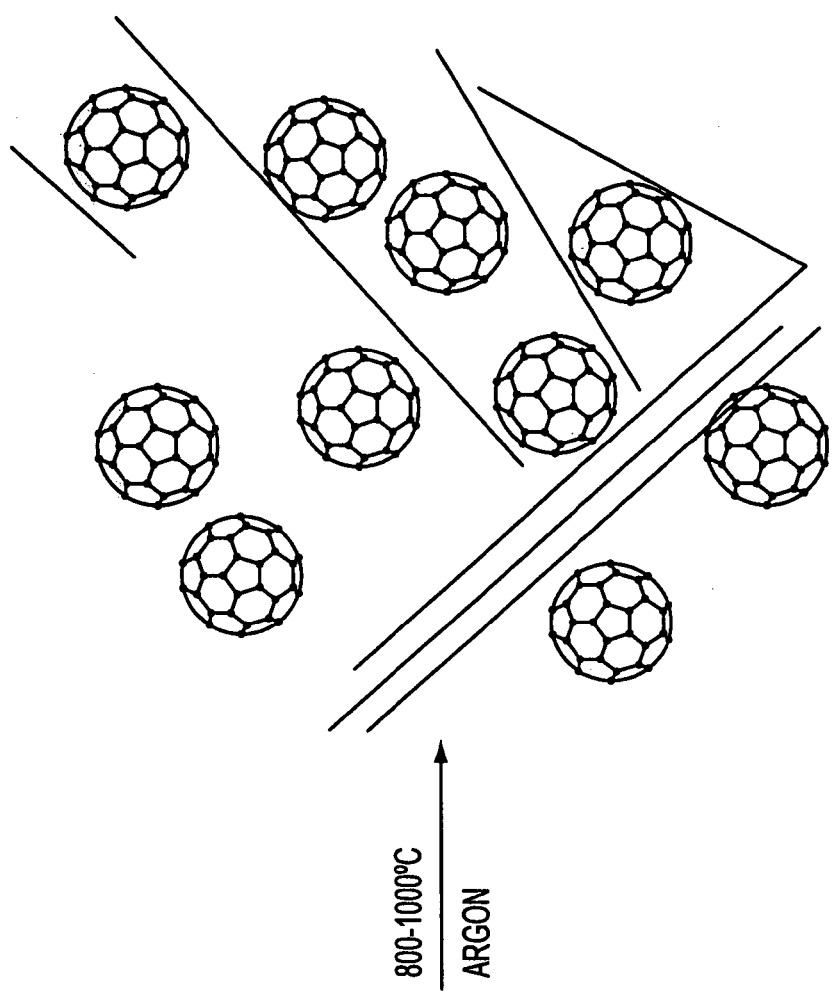

The macromolecular structure of fullerene-based electrodes can be controlled by selecting molecules for favorable electronic structure, for their reactivities with other carbonaceous binder materials and/or for tendency to acquire a favorable crystalline form. The techniques described below are methods which can be used to vary the chemico-physical properties of carbon compounds to create fullerene-based carbon electrodes with improved performance suited to many different applications.

Unlike the graphite or other carbon materials traditionally used in rechargeable lithium batteries, the structure of fullerene-based compositions can be better controlled during manufacture. Fullerene compositions, having a more ordered structure than ordinary graphite, result in electrodes in which lithium ions can intercalate more easily and completely, thereby increasing the possible energy density and reducing the capacity fade of the cell due to irreversible lithium ion intercalation. More complete lithium elimination during anode discharging also is possible with this technique.

Different ratios of fullerene or fullerene-like compounds may be added to traditional carbonaceous materials to improve their electrochemical properties. Additionally, different fullerene bulk materials may be used to produce fullerene electrodes with different characteristics. The fullerene-based carbon electrode materials may be heat-treated to increase their uniformity of structure and lithium ion capacity. Use of fullerene compounds allows for greater control of structure during manufacture, producing a unique, reproducible electrode material which is both more uniform and more electrically conductive than standard graphite electrodes. Both anodes and cathodes may be produced using fullerene or fullerene-based compounds to take advantage of these improved structural properties.

By the term "fullerene electrode," it is meant any electrode, anode or cathode, containing fullerene compounds, including those consisting essentially of one or more fullerene types and those containing fullerene mixed with one or more additional compound. The term "fullerene compounds" includes $C_{60}$, $C_{70}$, $C_{74}$ $C_{76}$, $C_{78}$ or any of the materials sometimes referred to as "small band gap fullerenes," larger $C_{80}$–$C_{100}$ compounds such as $C_{84}$ and $C_{100}$ or any of the so-called "giant fullerenes" (>$C_{100}$ spheroid or partially formed spheroid molecules) and the like. Chemically or physically modified fullerenes compounds such as fluorinated fullerenes or adducts and derivatives (such as, for example, those described in Cardulla et al., Helv. Chim. Acta 80:343–371, 1997; Zhou et al., J. Chem. Soc., Perkin Trans. 2:1–5, 1997; Okino et al., Synth. Metals 70:1447–1448, 1995; Okino et al., Recent Advances in the Chemistry and Physics of Fullerenes and Related Materials, vol. 3, 1996, pp. 191–199; Haddon et al., Nature 350: 320–322, 1991; Chabre et al., J. Am. Chem. Soc. 114: 764–766, 1992; Gromov et al., Chem. Commun. 2003–2004, 1997; Strasser et al., J. Phys. Chem. B 102: 4131–4134, 1998; Cristofolini et al., Phys. Rev. B: Cond. Matter Mater. Phys. 59:8343–8346, 1999; Wang et al., Synthetic Metals 103(1):2350–2353, 1999; Wang et al., Mater. Res. Soc. Symp. Proc. 413:571, 1996; Kallinger et al., Synthetic Metals 101:285–286, 1999; Kajii et al., Synthetic Metals 86:2351–2352, 1997; and Araki et al., Synthetic Metals 77:291–298, 1996, the disclosures of which are hereby incorporated by reference, also are encompassed within this term, as well as polymeric, copolymeric and crosslinked fullerene compounds and compositions. These compounds per se have been described in the prior art. The term includes all physical forms of the materials, including, for example, solids, gases, vapors, solutions, emulsions, powders, thin films and the like.

Specifically, the fullerenes and fullerene materials which may be used in this invention are $C_{60}$, $C_{70}$, $C_{74}$, $C_{76}$, $C_{78}$ and $C_{80-100}$. $C_{74}$ is greatly preferred for use in electrodes for lithium ion secondary batteries because of its highly favorable electrical properties, which previously have been unknown. $C_{74}$ is highly electronegative and allows lithium ions to move through the structure of the carbonaceous electrodes extremely easily and quickly, leading to a light weight battery with greatly improved efficiency, capacity and long life. In addition, $C_{74}$ is easier to synthesize and purify since it is one of the most abundant fullerenes. Electrodes consisting essentially of $C_{74}$ as the fullerene component are contemplated for use in the electrode materials of this invention, as well as fullerene mixtures in which the majority or even only aminority of the fullerene compounds are $C_{74}$. Therefore, highly purified $C_{74}$, semi-purified $C_{74}$ or fullerene mixtures containing $C_{74}$ may be used to make the compositions, electrodes and batteries of this invention, and are encompassed in the term "$C_{74}$." Preferred fullerene materials are at least 50% up to 99.9% or nearly 100% $C_{74}$.

Recently, fullerenes have been discovered to be highly reactive with oxygen, including atmospheric oxygen. It is very important, therefore, that all the fullerene compounds used in these inventive materials and electrodes be kept away from oxygen during all stages of production, including fullerene synthesis, purification, electrode synthesis, cell manufacture and packaging. Therefore, an inert atmosphere, such as argon or helium, must be used during all stages of manufacture of batteries containing these materials. Molecular oxygen from the atmosphere or other sources can be absorbed on the surface of fullerene molecules, resulting in the partial oxidation of the fullerene and dimerization or polymerization. The prior art has described the use of $C_{60}$ or $C_{70}$ to make some types of fullerene-based electrodes, and has described how to synthesize and purify them. However, no mention is made in the prior art that the materials are to be synthesized and manipulated in the absence of air at all stages. $C_{60}$ and $C_{70}$ samples will partially react with each other to form dimers (i.e., $C_{60}$-O-$C_{60}$) and polymers when exposed to air for just a few seconds. Brief exposure results in a reaction which is only partial, leaving most of the material undisturbed. However, the quantity that does react may create a passivating layer, and poison the electronic activity of the bulk fullerene material, making them far less useful for battery electrodes. Prior art fullerene materials, which have been exposed to the air for any length of time, however brief, therefore are not fullerenes but in fact fullerene dimers with quite different structures and bulk properties which make them unsuitable for use in lithium ion electrodes. $C_{74}$ is particularly reactive in this way and loses its highly beneficial and advantageous electrochemical properties if exposed to oxygen, even for a very short time. The methods and materials of the invention disclosed here eliminate this problem by ensuring that the fullerenes are not oxidized.

Generally, anodes for lithium batteries with improved electrical conductivity, greater electron density storage capacity (mAh/g) and better lithium intercalation-deintercalation properties over standard carbon anodes may be produced using any of the fullerenes. In one embodiment, fullerene compounds, preferably $C_{74}$, are mixed with graphite, pitch, coal pitch, coke, synthetic graphite, carbon black, carbon-arc generated soot electrode binder material or any other carbon-containing material known in the art for carbon anode production. Mixtures of these compounds also are suitable. Electrodes may be made having about 1% fullerene by weight to about 99% fullerene by weight. Generally, fullerene is desirably present at least about 10% by weight of the electrode material, desirably about 10% to about 50% and preferably about 10% to about 20% or 25% fullerene. It is contemplated that these ranges may be expanded or varied as called for by the types of materials used and the desired application of the electrode or battery. Those of skill in the art consider it routine to conduct experimentation to optimize ratios of components to achieve the desired result.

Figure 2B:
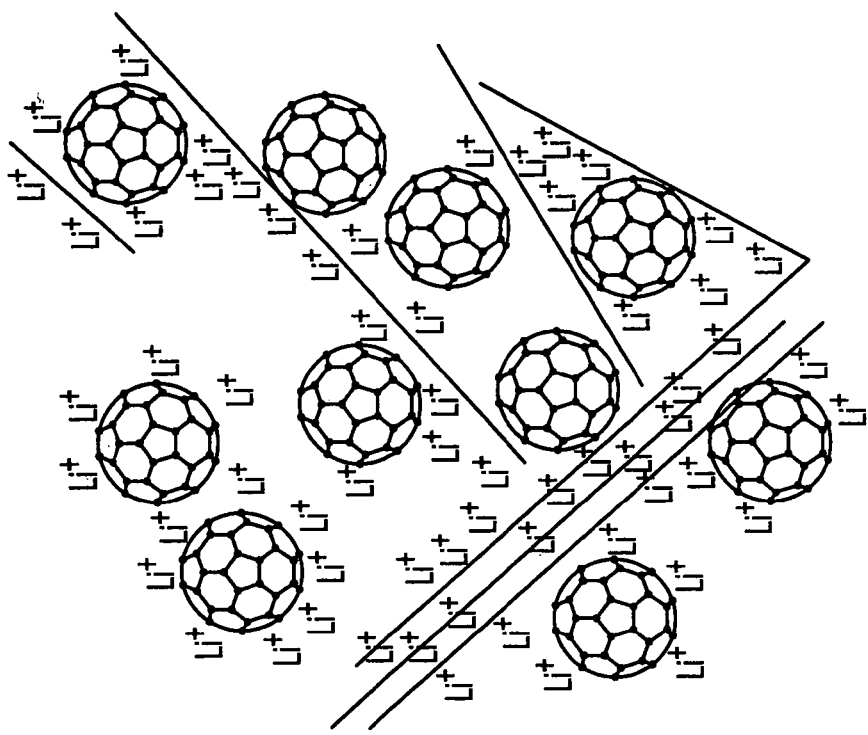
FIG. 2 is a conceptual illustration showing the benefit of heated versus unheated fullerene-graphite mixtures in terms of the ability of lithium to freely intercalate and bind to the carbon structures.
Figure 2A:
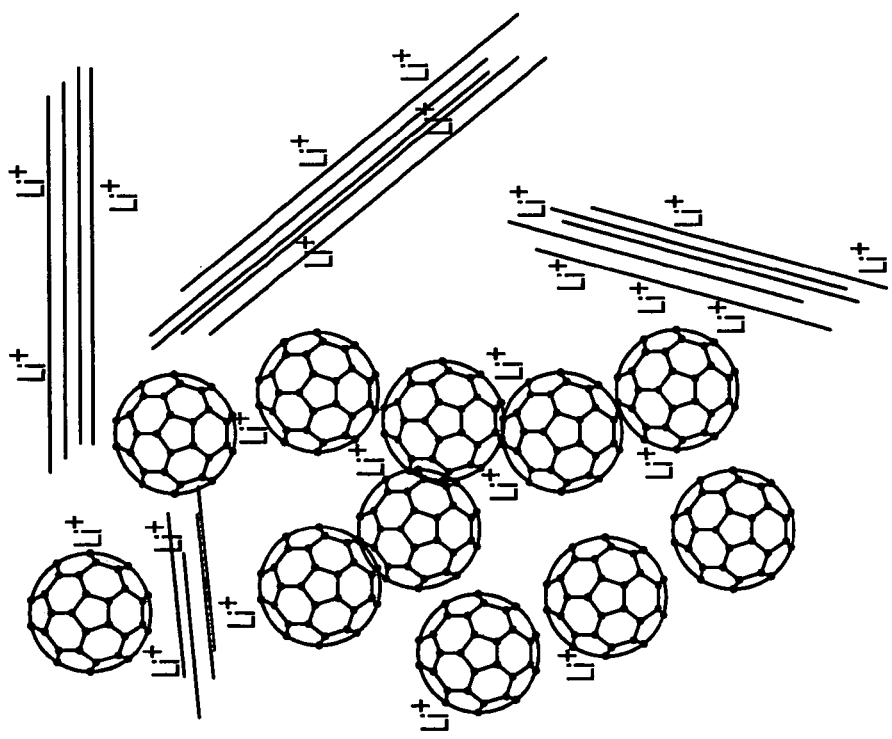

The mixture of the fullerene compound(s) and other carbonaceous material(s) preferably is pyrolyzed according to methods known in the art. Generally, the mixtures are heated to near the sublimation point of the added carbonaceous material (e.g., graphite, coke, and the like) and well past the sublimation point of the fullerenes, in closed, pressurized containers, held at this elevated temperature, and then slowly annealed over a period of about 1 hour to about 8 hours. Hydraulic pressure at about 50 atm to about 200 atm may be used. Annealing involves a slow lowering of the temperature from the reaction temperature to about room temperature, usually at a rate of about 1° C./min to about 10° C./min, however slower or faster rates may be used as is convenient. Generally a rate of about 1° C./min to about 5° C./min is preferred for the compounds of this invention. Suitable temperatures for any monomeric fullerene compound are usually about 400° C. to about 900° C. or from about 500° C. to about 900° C., although fluorinated fullerene compositions may be treated at temperatures from about 100° C. to about 900° C. The preferred temperature range is about 500° C. to about 600° C. As a result of the heating, the distance between graphene sheets increases and the fullerene molecules sublime and are able to move between the sheets, further separating the graphite layers. This new structural configuration allows for a higher degree of reversible lithium ion intercalation. See FIGS. 1 and 2. The diagrams depict $C_{60}$ molecules, but the concept is equally applicable to any fullerene, including $C_{74}$.

In the electrodes of the embodiments described above, unoxidized fullerenes intercalate between and around the carbon layers of graphite or other organic material. The fullerene-containing materials thus form more easily accessible intercalation sites for lithium ions when the cell is charged. Furthermore, this invention takes advantage of the ability of each fullerene molecule to attract and reversibly absorb up to six electrons. Because of the fullerene's ability to bind these electrons, it is beneficial to put as much fullerene in the electrode as reasonably possible (generally 1%–50% fullerene by weight of the carbonaceous electrode composition is attainable and results in an electrode with greatly improved properties over the prior art) to achieve the most improvement in electron density storage. However, a certain amount of binder is required to form the electrode from loose powder (generally 5–10% by weight). Therefore, the total composition of the electrode is about 1% to about 25% fullerene, about 3% to about 15% binder and the remainder graphite or other carbonaceous material. Electrodes comprising 1%, 2%, 3%, 5%, 8%, 10%, 12%, 15%, 18%, 20%, 25% fullerene, or up to 99% fullerene are contemplated. Binder material may be present as 3%, 5%, 8%, 10%, 12% or 15% of the total electrode composition weight. Preferred compositions generally are about 5% to about 20% fullerene and about 5% to about 10% binder. Most preferred compositions generally are about 10% to about 20% fullerene and about 5% to about 10% binder by weight. An example of a preferred electrode composition is 10% fullerene, 10% binder and 80% graphitic carbon by weight. These materials are more highly controllable in structure and concomitant electrochemical properties than ordinary graphite or other standard carbonaceous electrode materials since they can be synthesized and purified to form a reproducible and uniform product. Electrodes made according to this method have improved electrical conductivity, electron density storage, and intercalation/deintercalation properties over both standard carbon anodes and prior art electrodes containing fullerenes.

Generally, fullerenes may be synthesized according to any convenient method, including any prior art method such as the carbon arc method, (also referred to as the Kratschmer-Huffman method) and purified by any convenient means such as slow concentration of solutions, diffusion methods, cooling of saturated solutions, precipitation with a solvent, sublimation or electrochemically, and by liquid chromatographic separation, but in an inert atmosphere at all stages. An exemplary method for $C_{74}$ synthesis, adapted from Deiner and Alford, Nature 393: 668–671, 1998, is provided in Example 1.

Figure 3:
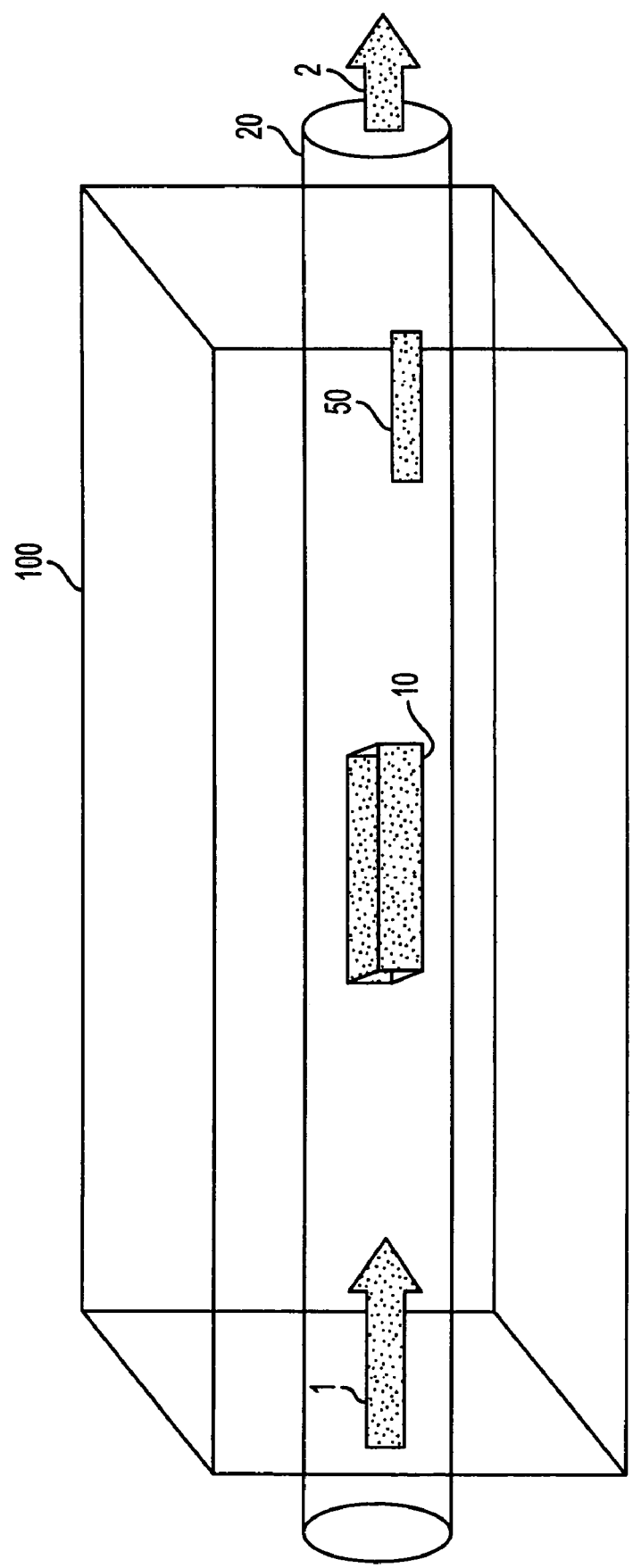
FIG. 3 is a schematic diagram of a sublimation tube furnace suitable for separating fullerene species from a mixture of fullerenes and carbonaceous material or for subliming crude or purified materials onto a cooled target for direct use as a fullerene anode.

For purification, after synthesis in an anaerobic environment, the fullerene compounds (e.g., $C_{60}$, $C_{70}$, $C_{74}$, $C_{80-100}$, and mixtures thereof) may be placed in an inert atmosphere furnace, vaporized and condensed at a specific temperature for each fullerene species onto a cool metal or graphite substrate. Crude or purified materials also may be condensed in the same manner onto a substrate of suitable size and proportion to form a battery electrode. See FIG. 3 for a diagram of a suitable sublimation tube furnace. In the furnace (100), inert gas, preferably argon, (1, 2) is continually flushed across a heated tube furnace chamber (20) containing fullerene material held in an inert boat (10). The temperature of the furnace is gradually increased. At about 500–800° C., the fullerene material becomes vaporized and moves from the graphite, ceramic or inert metal boat (10) in the center of the furnace (100) towards the cooler end of the furnace tube chamber (20). When the material reaches the outer region of the furnace, the vaporized fullerene condenses onto a cooled substrate (50). The target substrate should be made of metal or graphite for the fullerene to adhere to the substrate and so that the substrate will withstand the high temperatures of the furnace. The substrate, coated with deposited fullerene is eventually removed (under an inert atmosphere).

Fullerene deposition may be performed at varying rates to produce fullerene compositions having different degrees of crystallinity, as desired, forming an electrode which then may be assembled into lithium ion secondary cells. All of the fullerene-containing materials are kept away from atmospheric air or sources of oxygen during all stages of manufacture, including synthesis, purification, sublimation and assembly. This specific technique allows for better electrode thickness and fullerene crystallinity control than any prior method and permits better control of the electronic properties of the electrodes.

Film electrodes may be synthesized from anaerobically produced fullerenes, e.g., $C_{74}$. The $C_{74}$ may be placed in an electrically conductive organic solvent or solution and electrolytically reduced at a voltage of −1.0V versus an $AgNO_3$ reference electrode. Suitable organic solvents include $CH_3CN$, toluene or benzene with an electrolyte such as $TBAPF_6$, or $TBAPF_6$-doped $CH_3CN$. The electrolytic reduction causes $C_{74}^{n-}$ and some other fullerene anions to dissolve into solution. Particulate material is removed from the solution and the dissolved fullerene compounds may be redeposited onto a high surface area cathode. A voltage of +0.4V (versus $AgNO_3$ reference electrode) will cause $C_{74}^{n-}$ anions to redeposit, leaving the remaining fullerides in solution. Purified fullerene compounds on the high surface area cathode may be redissolved into any desired electrolytic solution and then redeposited onto the surface to be used in the electrode. See Example 4.

Varying thicknesses of the $C_{74}$ material can be achieved by replenishing the $C_{74}$ material-containing electrolyte solution or by slowly ramping the current to the system. The resulting electrode may then be placed in a ($Li_2CoO_2$ (or other lithium ion source) ∥ polymer electrolyte ∥ $C_{74}$ material) cell for testing. Completely uniform films of fullerene-based compounds may be prepared by gas phase deposition, or chemical vapor deposition (CVD) onto the surface of graphite anodes. Multiple layers of cathode and anode then may be stacked in an orderly manner, occupying very little space.

High carbon content anodes with improved performance according to the invention may be constructed using fullerene copolymers as well as fullerene monomers. These fullerenes are polymerized in either straight-chain (linear) or crosslinked (star) form. A conductive, highly reduced, porous, rubber-like fullerene material which easily accommodates intercalation and deintercalation of lithium cations results from star polymers. Electrically conductive linear fullerene polymer compounds, composed of $C_{60}$, $C_{70}$ or $C_{74}$ monomers or a mixture thereof, including derivatives of $C_{60}$, $C_{70}$ or $C_{74}$, also may be used. Linear copolymers of fullerenes may be synthesized according to methods available in the prior art, for example in Loy and Assink, *J. Am. Chem. Soc.* 114:3977–3978, 1992 ($C_{60}$-p-xylene copolymer), the disclosures of which are incorporated by reference.

Fullerene polymers having electrically conductive linking structures which crosslink between fullerene monomers in the polymeric structure are especially preferred. Most crosslinking species having this property have a conjugated (alternating double and single bonds) backbone. Preferably, there are about 3 to about 20 atoms linking the fullerene monomers. Any number of atoms which allows for complete pi-bond conjugation from fullerene to fullerene (alternating single and double bonds) is suitable. Any fullerene type may be used, however fluorinated fullerenes generally are not used for this application. Specific conductive polymer types which are useful include polyaniline (PANI), poly(p-phenylene) (PPP), polyacetylene (PA), polythiophene (PT), polypyrrole, polyisothionaphthene, polyethylenedioxythiophene (PEDOT), poly(phenylenevinylene), substituted derivations thereof and copolymers thereof. An exemplary alternating copolymer is bis-EDOT-arylene. (Sotzing et al., *Chem. Mater.* 8:882, 1996).

A conductive star polymer also may be synthesized in which two or more different conjugated arms radiate from the central core. The repeating units of these polymers include not only polymers with hundreds or thousands of repeating units, but also oligomers with 4–10 repeating units. Thus, the fullerene polymers suitable for use with this invention include those with four to about 10,000 repeating units.

Without wishing to be bound by theory, it is believed that these fullerene polymer compounds are particularly advantageous for use as anodes because the linking structures hold the fullerene monomers apart so that lithium ions may move freely through the structure. Therefore preferred polymers have a structure open enough for the ions to move freely, but not so open that space is wasted and charge density within the compound is sacrificed.

Fullerene polymers are superior electrode materials for several reasons. First, fullerene polymers can hold a large electrical potential on each fullerene without chemically degrading and the polymers provide a low resistance, evenly ordered conduit for this high potential to reach the battery terminal. Second, the higher degree of order brought about by the polymer can distribute charge more evenly throughout the electrode than randomly structured, pyrolyzed carbon materials. Third, the HOMO-LUMO gap for fullerenes is similar to graphite and can be tailored to the engineering needs of a target cell. Fourth, crosslinked fullerene polymers can be made sufficiently porous and regular to allow improved lithium ion intercalation.

Most desirable polymers are those which exhibit long range ordering of the polymers in the solid state. Polymer structures which promote such long range ordering and also which favor interchain charge hopping with favorable intermolecular spacings and pi overlap are thus advantageous and, generally preferred among the fullerene polymer compounds. Examples of such compounds are the poly(3-alkylthiophenes), and other compounds which may be regio-regular, such as 3-substituted polypyrroles and 1,4-polythiophenes. In general, any conductive star polymer may be used in the compositions, electrodes and batteries of this invention, including those described in U.S. Pat. No. 6,025,462 to Wang and Rauh, which is hereby incorporated by reference. $C_{74}$ or other fullene copolymers may be synthesized with polyaniline, poly(p-phenylene), polyacetylene, polythiophene, polypyrrole, polyisothionaphthene, polyethylenedioxythiophene, poly(phenylenevinylene), substituted derivatives thereof, or copolymers thereof. Preferably, regular intervals are maintained between fullerenes in the polymer structure.

Polymeric fullerenes may be composed of any fullerene monomer or combination of monomers, however, $C_{74}$ has extremely favorable electrical conductivity properties such as its degenerate valency orbitals and therefore is preferred. Due to the multiple orbital degeneracies of $C_{74}$, and the electrically conductive links between each $C_{74}$ molecule, this electrode material provides greatly improved, more regular intercalation/deintercalation sites for lithium ions over prior carbon electrode art. These electrodes provide almost no electrical resistance whatsoever, and as a result, can produce the most favorable intercalation-deintercalation sites for lithium ions of any known fullerene. Lithium ion intercalation capability is dramatically improved compared with either conventional porous graphitic battery anodes or anodes made with partially oxidized (or air-exposed) fullerene-containing material.

Therefore, it is important to note that the fullerene monomers must be handled exclusively in an oxygen-free environment to retain their unique electrochemical activity. Forming these compounds in an inert atmosphere using fullerenes which have never been exposed to oxygen, results in a product which is surprisingly improved. Once the polymer is synthesized, exposure to oxygen does not harm the material.

Fluorinated $C_{74}$ has unexpectedly advantageous electrical properties which make it useful for the manufacture of cathodes. Fluorinated graphite intercalated with fluorinated $C_{7-4}$ has greatly improved properties, providing easier and more regular lithium ion intercalation and deintercalation into and from the cathode. Similar efforts using fluorinated graphite alone (also known as fluorinated carbon, $CF_8$) have met with some success, but the structure of the material was inherently difficult to control, for the reasons discussed. Fluorinated $C_{74}$, however, possesses unique electrical and redox properties which allow $C_{74}$-based cathodes to provide a lithium ion source in which more lithium ions are present in the material and more lithium ions are able to exit the cathode during charging than most inorganic salts or oxides (the standard in this industry). In addition, the lithium ions are far more easily dissociated from the cathode for ion migration.

$C_{74}$ may be directly fluorinated by exposure to $F_2$ gas according to methods known in the prior art. Once fluorinated, the fullerene material is white in color and is air inert. Therefore, once fluorinated, further manipulation of this material may be carried out in air atmosphere, although special attention should be paid to keep conditions free of water to prevent water contamination of the final battery. Direct fluorination yields a product which may contain from about 2 up to 74 atoms of fluorine per $C_{74}$ molecule. The term "fluorinated $C_{74}$" therefore encompasses any degree of fluorination, including $C_{74}F_{74-2x}$, wherein x=0–16. On average, the degree of fluorination is about 48 fluorine atoms per $C_{74}$ molecule, resulting in $C_{74}F_{48}$. Intercalates made up of fluorinated graphite and fluorinated $C_{74}$ can be made in the same manner described above for non-fluorinated compounds.

The following examples are provided to illustrate the invention described above and are not intended to be limiting.

EXAMPLES

Example 1

$C_{74}$ Synthesis

Fullerenes are synthesized by the carbon-arc (Kraetschmer-Huffman) method, and sublimed directly from the soot onto a water-cooled target under vacuum at 750° C. The resulting sublimate is collected and washed 3 times with degassed o-xylene under a helium atmosphere using 1 ml or more o-xylene for every milligram of material washed or until the wash is colorless. This wash removes fullerenes which are soluble in organic solvents in their neutral state, leaving $C_{74}$ and some other compounds which are insoluble under these conditions. Following washing, the solvent is removed by heating the resulting insoluble material under vacuum for 2 hours. The solid then is suspended in a degassed 0.1 M solution of tetrabutylammonium hexafluorophosphate ($TBA^+PF_6^-$) electrolyte in acetonitrile ($CH_3CN$). The resulting solution then is electrochemically reduced at −1.0 V versus a $Ag/AgNO_3$ reference electrode. Both the working (cathode) and the auxiliary (anode) electrodes are platinum. The working electrode is a high surface area platinum mesh electrode. After the cell is equilibrated at −1.0V, the electrodes are removed from the solution containing numerous different fullerene anions in solution, and the electrolyte solution is filtered with a 0.45 μm membrane filter. The solution then is reoxidized at +0.4V using the same electrochemical system. Reoxidation precipitates near-pure $C_{74}$ onto the surface of the working electrode, although some minor impurities of $C_{76}$ through $C_{100}$ are present. See FIG. 4 for a schematic diagram of this method.

Example 2

Fullerene-Graphite Anodes for Lithium Secondary Batteries

Lithium ion battery carbon anodes with improved electrical conductivity, greater electron density storage (mAh/g), and intercalation/deintercalation properties over standard carbon or air-exposed fullerene anodes are synthesized using fullerenes as follows. Purified $C_{74}$, which has been synthesized with no exposure to oxygen is mechanically ground together with graphite (10% $C_{74}$, 90% graphite by weight) under an inert atmosphere. The mixture then is slowly heated to 500° C. at a rate of 1° C./min under vacuum in a sealed container. The mixture is held at 500° C. for 8 hours, and then cooled at a rate of 5° C./min to room temperature. This mixture is then mechanically combined with polyethylene binder material (10% binder, 90% fullerene graphite mixture by weight) and pressed onto a metal electrode terminal at a pressure of 50 atm for 2 hours under vacuum using a hydraulic press heated to 50° C., and then allowed to come to room temperature. The resulting electrode may be used as an anode in whatever batter configuration is desired. The fullerene materials are kept away from atmospheric air during all stages of manufacture, including synthesis, purification, mixing, pyrolysis, pressing, storage and assembly.

Example 3

$C_{74}$ Polymer Anodes

Purified $C_{74}$ is mechanically mixed with bis-EDOT-arylene in a ratio of 10% $C_{74}$ to 90% bis-EDOT-arylene by weight in an inert atmosphere and reacted according to prior art methods. The resulting $C_{74}$ copolymer ("star polymer") is then mixed with a binder material as described in Example 1 and pressed with a heated hydraulic press at 50° C. and a pressure of 50 atm onto a metal battery terminal for 2 hours. Although the $C_{74}$ monomer is not exposed to oxygen prior to polymerization, the polymer may be exposed to air without harm. After cooling to room temperature, the anode may be assembled into a lithium ion battery.

Example 4

Fluorinated Fullerene Cathode Materials for Lithium Ion Secondary Batteries Materials for fullerene-based lithium ion battery cathodes are synthesized by direct fluorination of $C_{74}$. $C_{74}$ is dried under dynamic vacuum (<1 torr) for 8 hours with heating, and placed in a pressure vessel. The vessel is filled with 1 atm $F_2$ gas and then heated to 100° C. for 48 hours with mechanical agitation of the solid. The solid, off-white material which results has been chemically altered (fluorinated) to produce an air-inert material which can then be exposed to oxygen. This material is mechanically mixed with fluorinated carbon ($CF_8$) and a polyethylene binder in a mixture containing 10% fluorinated $C_{74}$, 7% polyethylene binder material and 83% $CF_8$. This mixture then is pressed with a heated hydraulic press at 50° C. and a pressure of 50 atm onto a metal battery terminal for 2 hours. The resulting electrode is removed and placed in a cell as the anode with a lithium metal cathode in an electrolyte solution composed of tetrabutylammonium hexafluorophosphate electrolyte in acetonitrile. A +0.1V potential (with respect to the $Li/Li^+$ couple) is placed on the system, and lithium ions are allowed to migrate to the fluorinated fullerene electrode until the system has come to equilibrium. The fullerene-based electrode then is removed, washed with clean acetonitrile and dried. The electrode is now ready to be placed in a battery as the cathode (lithium ion source).

The invention claimed is:

1. A method of forming an electrode comprising:
   synthesizing fullerenes in a substantially oxygen free atmosphere; wherein the synthesized fullerenes include $C_n$ compounds, where $n \geq 74$; and
   combining the synthesized fullerenes with a carbonaceous material in a substantially oxygen free atmosphere to form the electrode.

2. The method of claim 1, wherein the formed electrode includes a majority of fullerenes that are substantially unoxidized.

3. The method of claim 1, wherein the fullerenes are synthesized and combined with the carbonaceous material in an atmosphere comprising at least one of argon and helium.

4. The method of claim 1, wherein the electrode includes fullerenes in an amount from about 1% to about 25% by weight.

5. The method of claim 1, wherein a polymeric binder material is further combined with the synthesized fullerenes and the carbonaceous material to form the electrode.

6. The method of claim 1, wherein the carbonaceous material includes graphite.

7. The method of claim 1, further comprising:
   forming a lithium ion battery including the formed electrode.

* * * * *